United States Patent
Uskela et al.

(10) Patent No.: US 8,037,134 B1
(45) Date of Patent: Oct. 11, 2011

(54) CONTROLLED MULTICAST

(75) Inventors: Sami Uskela, Espoo (FI); Aapo Rautiainen, Espoo (FI); Eva-Maria Leppänen, Espoo (FI); Lucia Tudose, Espoo (FI); Mari K. Nieminen, Espoo (FI)

(73) Assignee: Eight Esemay DE L.L.C., Dover, DE (US)

( * ) Notice: Subject to any disclaimer, the term of this patent is extended or adjusted under 35 U.S.C. 154(b) by 0 days.

(21) Appl. No.: 10/049,590

(22) PCT Filed: Sep. 9, 1999

(86) PCT No.: PCT/EP99/06660
§ 371 (c)(1),
(2), (4) Date: Jun. 6, 2002

(87) PCT Pub. No.: WO01/19029
PCT Pub. Date: Mar. 15, 2001

(51) Int. Cl.
*G06F 15/16* (2006.01)
(52) U.S. Cl. .................. 709/205; 709/245; 370/432
(58) Field of Classification Search .......... 709/205, 709/223, 232, 245, 238, 200–202, 227; 370/432
See application file for complete search history.

(56) References Cited

U.S. PATENT DOCUMENTS

| | | | | |
|---|---|---|---|---|
| 5,933,605 A * | 8/1999 | Kawano et al. | ............... | 709/238 |
| 6,055,364 A * | 4/2000 | Speakman et al. | ............ | 709/229 |
| 6,175,875 B1 * | 1/2001 | Stapleton et al. | ............ | 709/250 |
| 6,331,983 B1 * | 12/2001 | Haggerty et al. | ............ | 370/400 |
| 6,430,183 B1 * | 8/2002 | Satran et al. | ................. | 370/389 |
| 6,490,285 B2 * | 12/2002 | Lee et al. | ................. | 370/395.31 |
| 6,505,247 B1 * | 1/2003 | Steger et al. | .................. | 709/224 |
| 6,801,944 B2 | 10/2004 | Motoyama et al. | | |
| 6,873,627 B1 * | 3/2005 | Miller et al. | .................. | 370/466 |
| 7,466,703 B1 * | 12/2008 | Arunachalam et al. | ........ | 370/392 |

FOREIGN PATENT DOCUMENTS

JP 10-257050 9/1998

OTHER PUBLICATIONS

Jianzhong Zhou: "Heterogeneous multicasting based on RSVP and QoS Filters" Communication Technology Proceedings, 1998, vol. 2, Oct. 22-24, 1998, pp. 1-8, XP002140105.
Yeadon N. et al: "Filters: QoS Support Mechanisms for Multipeer Communications" Communications, US IEEE Inc. New York, vol. 14, No. 7, Sep. 1, 1996, pp. 1245-1262, XP000626275.

(Continued)

*Primary Examiner* — Moustafa M Meky

(57) ABSTRACT

According to the present invention a method and an apparatus in a packet-switched network for supplying data packets to receivers (4*a-c*) belonging to a multicast group are disclosed. The apparatus comprises a routing means (2) for receiving data packets from a sender (1) and for buffering data packets the destination address of which is a multicast address of a multicast group. The apparatus further comprises a control means (3) communicating with the routing means (2) for determining the addresses of the receivers (4*a-c*) of the multicast group indicated by the multicast address and receiver-specific parameters, for designating filters for each receiver (4*a-c*) and/or each determined receiver address in accordance with the receiver-specific parameters and for supplying the determined addresses and designated filters to the routing means (2). The routing means (2) filters the multicast data packets and/or the determined addresses with the designated filters for each receiver (4*a-c*) of the multicast group and supplies the filtered multicast dam packets to the filtered receiver addresses.

33 Claims, 3 Drawing Sheets

OTHER PUBLICATIONS

Communication from the European Patent Office for application No. 99 974 002.0, dated Jun. 16, 2005.
Communication from the European Patent Office for application No. 99 974 002.0, dated Sep. 24, 2004.
International Preliminary Examination Report for PCT/EP99/06660, mailed Dec. 14, 2001.
International Search Report for PCT/EP99/06660 mailed Jun. 28, 2000.
Summons to attend oral proceedings from the European Patent Office for application No. 99 974 002.0, dated Sep. 28, 2006.
Written Opinion for PCT/EP99/06660, mailed Oct. 31, 2001.

* cited by examiner

CONTROLLED MULTICAST

PRIORITY CLAIM

This is a U.S. national stage of PCT application No. PCT/EP99/06660, filed on Sep. 9, 1999. Priority is claimed on that application.

FIELD OF THE INVENTION

The present invention relates to multicast address mapping in a packet-switched network, and in particular to a method and an apparatus in a packet-switched network for supplying data packets to receivers belonging to a multicast group.

BACKGROUND OF THE INVENTION

Multicast is a point to multipoint service in a network where different subscribers have to subscribe to a multicast group. Multicast technique generally is used by applications that want to reach a group of like-minded receivers who normally are not known by the sender in advance.

Multicast technique is well suitable for radio or TV broadcasting. Transmission of sound or image will become popular also in a wireless network in future when the UMTS (Universal Mobile Telecommunications System) technology will provide needed capacity. A multicast address identifies a group of interfaces or subscribers. Data packets that are sent to a multicast address are supplied to all of the interfaces or subscribers of the group by means of the Internet Group Management Protocol (IGMP).

However, according to conventional multicast technique it is not possible to consider different needs of different subscribers belonging to a multicast group.

SUMMARY OF THE INVENTION

It is therefore an object of the present invention to solve the above-mentioned problem and to enable different manipulation of multicast data packets for different receivers belonging to a multicast group.

According to a first aspect of the present invention this object is achieved by a method in a packet-switched network for supplying data packets to receivers belonging to a multicast group, comprising the steps of:
  receiving data packets from a sender;
  buffering data packets the destination address of which is a multicast address of a multicast group;
  determining the addresses of the receivers of the multicast group indicated by the multicast address and determining receiver-specific parameters;
  filtering the multicast data packets in accordance with the receiver-specific parameters for each receiver of the multicast group; and
  supplying the filtered multicast data packets to the determined receiver addresses.

Furthermore, according to the first aspect, the object is achieved by an apparatus in a packet-switched network for supplying data packets to receivers belonging to a multicast group, comprising:
  a routing means for receiving data packets from a sender and for buffering data packets the destination address of which is a multicast address of a multicast group; and
  a control means communicating with the routing means for determining the addresses of the receivers of the multicast group indicated by the multicast address and receiver-specific parameters, for designating filters for each receiver in accordance with the receiver-specific parameters and for supplying the determined addresses and designated filters to the routing means;
  wherein the routing means filters the multicast data packets with the designated filters for each receiver of the multicast group and supplies the filtered multicast data packets to the determined receiver addresses.

According to a second aspect of the present invention, the above-mentioned object is achieved by a method in a packet-switched network for supplying data packets to receivers belonging to a multicast group, comprising the steps of:
  receiving data packets from a sender;
  buffering data packets the destination address of which is a multicast address of a multicast group;
  determining the addresses of the receivers of the multicast group indicated by the multicast address and determining receiver-specific parameters;
  filtering the determined addresses in accordance with the receiver-specific parameters; and
  supplying the multicast data packets to the filtered receiver addresses.

Furthermore, according to the second aspect, the object is achieved by an apparatus in a packet-switched network for supplying data packets to receivers belonging to a multicast group, comprising:
  a routing means for receiving data packets from a sender and for buffering data packets the destination address of which is a multicast address of a multicast group; and
  a control means communicating with the routing means for determining the addresses of the receivers of the multicast group indicated by the multicast address and receiver-specific parameters, for designating filters for each determined receiver address in accordance with the receiver-specific parameters and for supplying the determined addresses and designated filters to the routing means;
  wherein the routing means filters the determined addresses with the designated filters for each receiver of the multicast group and supplies the multicast data packets to the filtered receiver addresses.

With the IN controlled multicast addressing to subscribers of a multicast group according to the present invention subscriber-specific restrictions or exceptions can be set. For example, multicast data packets can be allowed to be sent to a receiver according to a time schedule. Also a content of data packets can be matched to the capability of a receiver.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

DETAILED DESCRIPTION OF THE PREFERRED EMBODIMENTS

The idea of the present invention is to provide Intelligent Network (IN) control for the multicast service.

Figure 1:
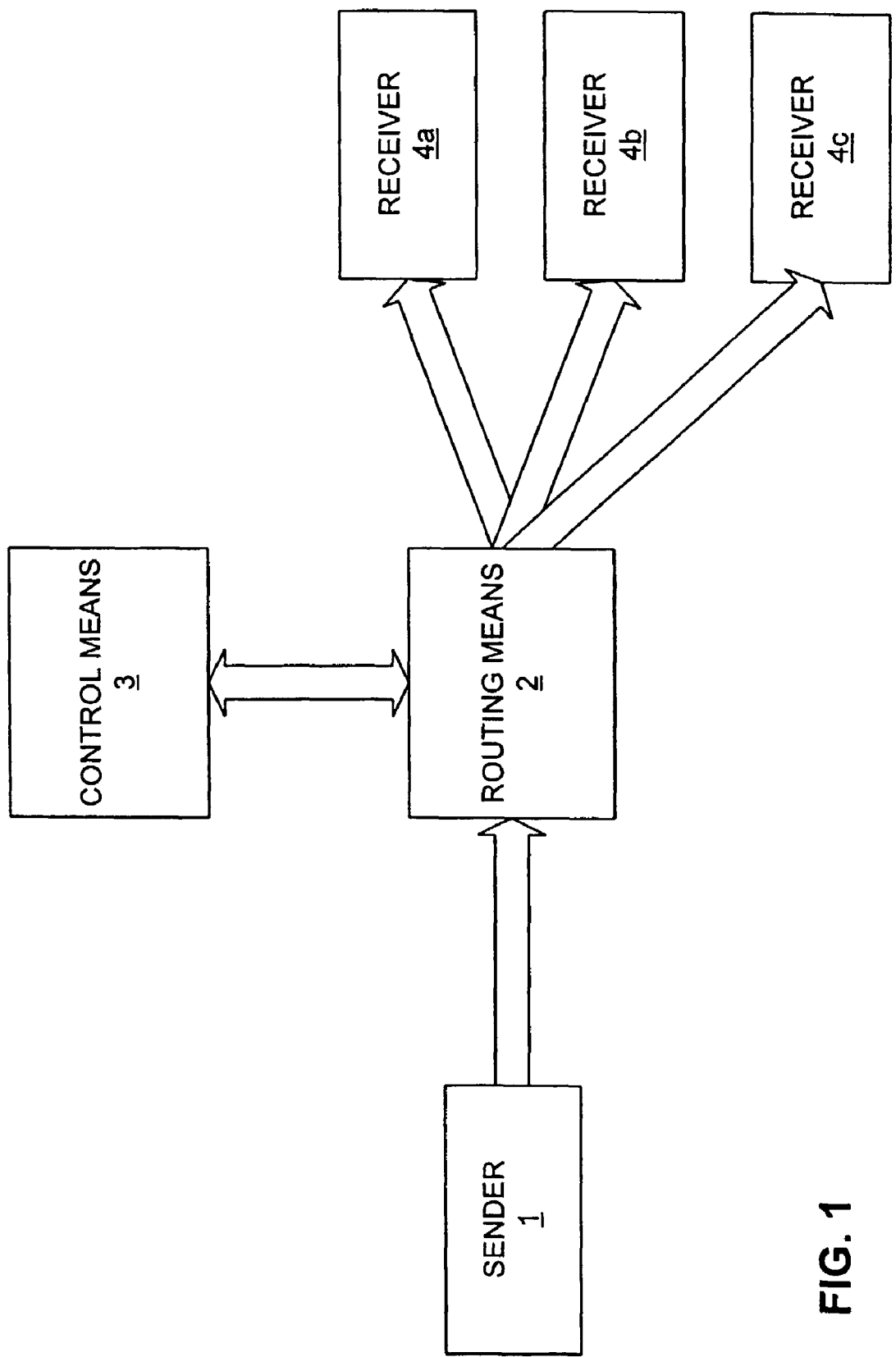
FIG. 1 shows a schematic block diagram of the basic components of a system according to the present invention.

FIG. 1 shows a schematic block diagram of the system according to the present invention. For purpose of simplification merely the basic components of the system are shown in the diagram.

A sender 1 sends data packets to a routing means 2 in a packet-switched network. For example, the routing means 2 can be an Internet router or a proxy server. In case the sender 1 sends data packets to a multicast address indicating a multicast group the routing means 2 has to route the data packets to the members of the multicast group, for example to receivers 4a to 4c. A receiver belonging to a multicast group may be a UMTS subscriber in a GSM (Global System for Mobile communications) network.

However, each receiver 4a-c may have specific needs with respect to data communications. Thus, according to the present invention, a control means 3 such as an SCP (Service Control Point) is provided for the routing means 2. The control means 3 stores tables of addresses of receivers belonging to multicast groups and specific filtering parameter of these receivers in a table in advance. The parameters can be references to predefined filtering algorithms, address of an external filter device or specific filtering rules. The predefined algorithms can include image filtering, advertisement filtering, etc.

When the routing means 2 receives data packets which destination address is a multicast address addressing the receivers 4a-c it buffers these multicast data packets and communicates the multicast address to the control means 3 in order to fetch the address list of the receivers belonging to the detected multicast group. Moreover, the routing means 2 is able to check the data packets on certain contents or data amount and communicate the results to the control means 3. The control means 3 determines the addresses of the receivers belonging to the multicast group indicated by the multicast address by using the stored tables, i.e. the control means 3 prepares the receiver list for the multicast address. For example, the control means 3 determines the addresses of the receivers 4a-c which belong to the same multicast group. Then the control means determines specific parameters of each receiver 4a-c by searching the stored table in which the specific parameters for the receivers of this multicast group are defined, i.e. the control means 3 checks filtering parameters for each receiver of the prepared receiver list. On the basis of the determined receiver-specific filtering parameters and taking into account the checking results communicated by the routing means 2, the control means 3 designates a filter or filtering rules for each receiver 4a-c and communicates the list of receiver addresses and the filtering rules per address to the routing means 2. According to SCP implementation, service logic programs in the SCP effect this operation.

The routing means 2 filters the data packets for each of the receivers 4a-c according to the designated filter for each receiver 4a-c and transmits the packets to the receivers 4a-c if the packets pass the filter. In this way the data packets can be modified for each receiver 4a-c according to its needs defined in the receiver-specific parameters. This filtering function may be integrated in the routing means or, alternatively, in a separated device, e.g. in a proxy.

It is also possible to filter the addresses of the receivers belonging to a multicast group. The control means 3 can designate filters for the receiver addresses so that the routing means does not route any data packets to receivers which addresses are filtered out.

The receiver-specific filtering parameters may be dependent on receiver conditions or capabilities, including for example reachability of the receiver, available bandwidth, type of terminal screen such as big/small, color/monochromatic, graphical/text and the like.

Figure 2:
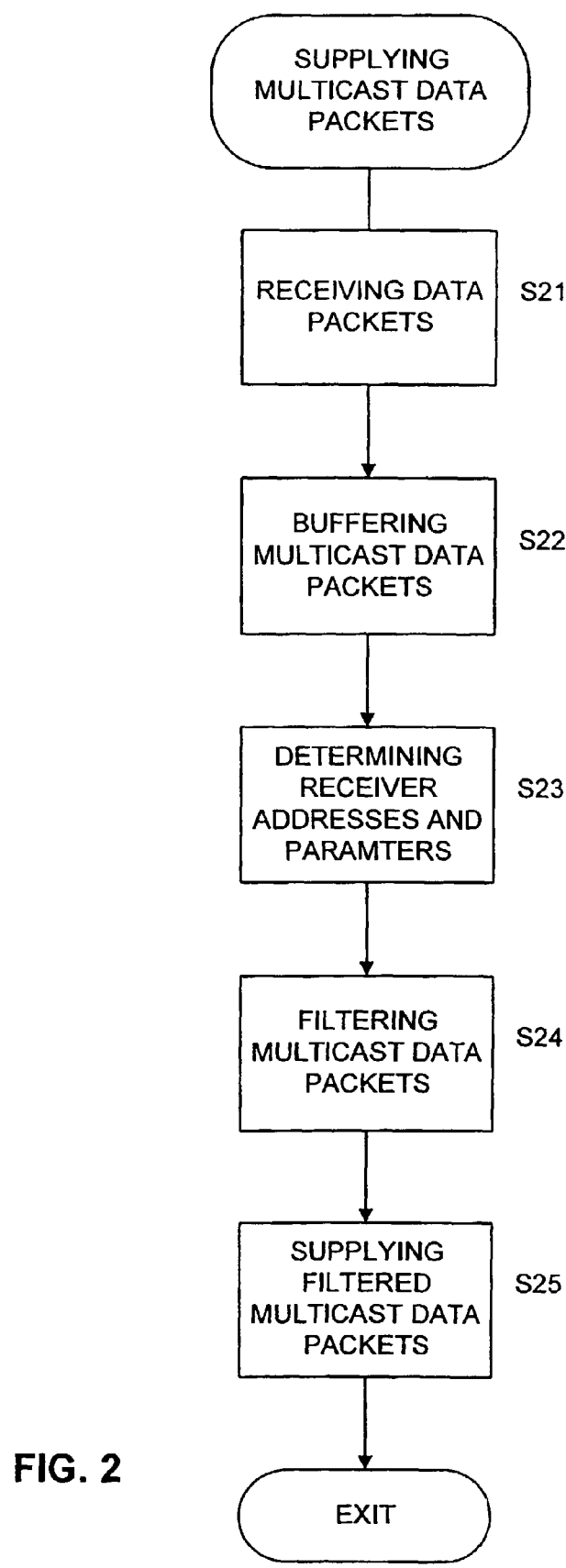
FIG. 2 shows a flowchart of an operation of a routing means and a control means of FIG. 1 according to a first embodiment of the present invention.

In the following a first embodiment of the present invention will be described with reference to FIG. 2. According to the first embodiment of supplying multicast data packets, these packets can be modified by means of filters designated by the control means 3 for each receiver 4a-c.

In a first step S21 data packets are received by the routing means 2 from the sender 1. In case the data packets are sent to a multicast address by the sender the multicast data packets are buffered in the routing means 2 in step S22. Then the addresses of the receivers 4a-c of the multicast group indicated by the multicast address are determined in step S23. Furthermore, in step S23, the receiver-specific parameters are determined. As described before, the determination is carried out by the control means 3 providing the list of receiver addresses which may include the receiver-specific filtering parameters to the routing means 2.

In step S24 the multicast data packets are filtered in accordance with the determined receiver-specific parameters for each receiver 4a-c of the multicast group. That is, filters are designated for each receiver 4a-c on the basis of the receiver-specific parameters and the data packets are modified using the filters. Finally, the modified or filtered multicast data packets are supplied to the respective receivers 4a-c.

The receiver-specific parameters can indicate a certain content of data packets that is not to be received by a specific receiver or a data amount of a certain content of data packets which data amount is not to be received by a specific receiver. For example, a multicast receiver 4a that is roaming in a GSM network may have not enough capacity to handle images. Thus, it has indicated in its parameters that it does not want to receive any images. When the control means 3 determines the address of the receiver 4a and its parameters in step S23 it designates a filter for filtering out image data from the multicast data packets and supplies this filter information to the routing means 2. The routing means 2 filters the data packets for the receiver 4a so that no images are present in the filtered data packets and supplies the filtered packets to the receiver 4a.

In this context the receiver 4a can indicate in its parameters that it does not want to receive images only when it is roaming in the network. In this case the control means 3 checks the conditions of the receiver 4a and designates the filter accordingly. Moreover, certain time intervals can be indicated in the receiver-specific parameters in which time intervals certain contents are not to be received by the receiver.

Figure 3:
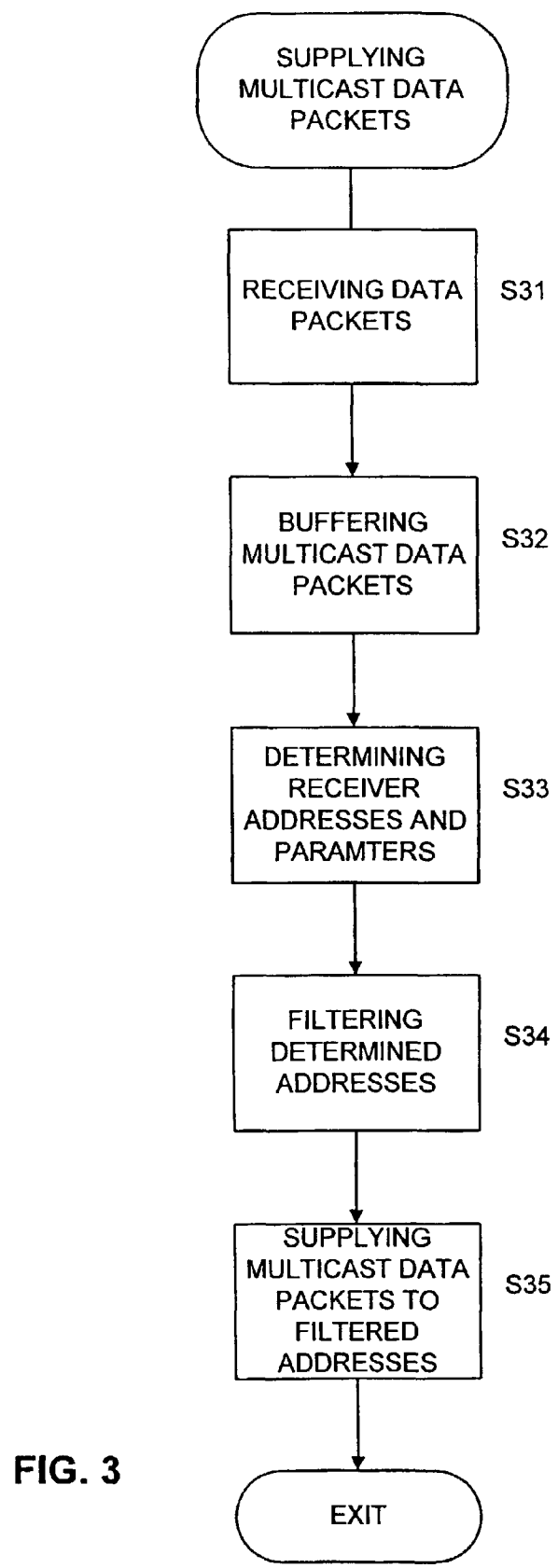
FIG. 3 shows a flowchart of an operation of the routing means and control means of FIG. 1 according to a second embodiment of the present invention.

In the following, a second embodiment of the present invention will be described with reference to FIG. 3. According to the second embodiment of supplying multicast data packets, addresses of receivers belonging to a multicast group can be filtered out so that specific receivers do not receive any multicast data packets.

In step S31 data packets are received by the routing means 2 from the sender 1. In case the data packets are sent to a multicast address they are buffered in the routing means 2 in step S32. In step S33 the receiver addresses and receiver-specific parameters are determined by the control means 3 and transmitted to the routing means 2. Moreover, in step S33 certain contents or a data amount of the multicast data packets can be checked by the routing means 2 and the results are communicated to the control means 3. In step S34 the determined addresses of the receivers 4a-c belonging to the multicast group are filtered. To be precise, the control means 3 designates filters for each receiver 4a-c on the basis of the receiver-specific parameters. In designating the filters, the control means 3 can also considers the results about a certain content or data amount of the multicast data packets. The control means 3 communicates the filter information to the routing means 2 which filters the receiver addresses using this filter information and supplies the multicast data packets to the filtered receiver addresses in step S35.

For example, the receiver 4*b* can indicate in its parameters that it does not want to receive data packets during a certain time interval. Thus, when the control means 3 determines the address of the receiver 4*b* and its parameters in step S33 it checks time and date. If the multicast data packets would be sent in the excluded time interval the control means designates the filter information so that the address of the receiver 4*b* is filtered out by the routing means 2.

Furthermore, the receiver 4*c* may indicate in its parameters that it does not want to receive any advertisement. When the control means 3 determines the address of the receiver 4*c* and its parameters in step S33 it detects that a certain content of data packets, i.e. advertisement, is not to be received by the receiver 4*c*. Therefore, the control means 3 requests the routing means 2 to check the content of the buffered data packets. Thereupon the routing means 2 checks the content and communicates the results to the control means. In case the content is advertisement, the control means 3 designates the filter for the receiver 4*c* such that its address is filtered out so that the data packets are not routed to the receiver 4*c*.

The receivers can also indicate a certain data amount of data packets which is not to be received. In addition, the receivers can indicate a certain data amount of a certain content which data amount is not to be received. The routing means 2 may check the content and data amount always when buffering the multicast data packets or on request.

As it is obvious for a person skilled in the art the features of the first and second embodiments can be combined. For example, when the routing means 2 receives multicast data packets from the sender 1 it supplies modified multicast data packets to the receiver 4*a*, no multicast data packets to the receiver 4*b*, i.e. the address of the receiver 4*b* is filtered out, and unchanged multicast data packets to the receiver 4*c*.

The routing means 2 may recognize multicast data packets on the basis of their multicast address. Alternatively, this recognition may also be performed on an upper protocol level by interpreting certain messages like the HTTP/SMTP (Hyper Text Transfer Protocol/Simple Mail Transfer Protocol) push message out of the data packets by the routing means.

With the IN controlled multicast addressing to subscribers of a multicast group according to the present invention subscriber-specific restrictions or exceptions can be set. For example, multicast data packets can be allowed to be sent to a receiver according to a time schedule. Also a content of data packets can be matched to the capability of a receiver.

According to the present invention a method and an apparatus in a packet-switched network for supplying data packets to receivers belonging to a multicast group are disclosed. The apparatus comprises a routing means for receiving data packets from a sender and for buffering data packets the destination address of which is a multicast address of a multicast group. The apparatus further comprises a control means communicating with the routing means for determining the addresses of the receivers of the multicast group indicated by the multicast address and receiver-specific parameters, for designating filters for each receiver and/or each determined receiver address in accordance with the receiver-specific parameters and for supplying the determined addresses and designated filters to the routing means. The routing means filters the multicast data packets and/or the determined addresses with the designated filters for each receiver of the multicast group and supplies the filtered multicast data packets to the filtered receiver addresses.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method comprising:
    receiving a multicast data packet at a routing unit of a communication system, wherein the multicast data packet includes a multicast address associated with a multicast group;
    identifying a receiver address associated with the multicast address;
    identifying one or more parameters associated with the receiver address, wherein at least one of the one or more parameters identifies a type of content that is not to be sent to the receiver address;
    filtering the multicast data packet based on the one or more parameters to generate a filtered data packet, wherein the filtering includes removing the type of content from the multicast data packet to generate the filtered data packet; and
    transmitting the filtered data packet to the one of the receiver address.

2. The method of claim 1, further comprising maintaining a table that associates the receiver address with the multicast address, wherein the table is stored at a control unit.

3. The method of claim 1, further comprising maintaining a table that associates the one or more parameters with the receiver address.

4. The method of claim 1, wherein the one or more parameters are dependent on one or more conditions of a receiver associated with the receiver address.

5. The method of claim 1, wherein at least one of the one or more parameters identifies a data size limit that can be sent to the receiver address.

6. The method of claim 1, wherein at least one of the one or more parameters identifies a time at which data packets are not to be sent to the receiver address.

7. The method of claim 1, further comprising filtering a plurality of receiver addresses associated with the multicast address to identify one or more receiver addresses that are not to receive the multicast data packet.

8. The method of claim 7, wherein the filtering of the plurality of receiver addresses is based at least in part on parameters associated with the plurality of receiver addresses, and wherein the parameters are associated with at least the one or more receiver addresses that are not to receive the multicast data packet.

9. The method of claim 1, wherein at least one of the one or more parameters comprises an instruction to not send an advertisement to the receiver address.

10. The method of claim 1, wherein at least one of the one or more parameters comprises an instruction to not send an image to the receiver address.

11. The method of claim 1, wherein at least one of the one or more parameters is based in part on whether a receiver associated with the receiver address is roaming.

12. The method of claim 1, wherein at least one of the one or more parameters is based in part on a characteristic of a display of a receiver associated with the receiver address.

13. The method of claim 12, wherein the characteristic of the display comprises at least one of a size of the display, a color attribute of the display, or a graphical attribute of the display.

14. The method of claim 1, wherein at least one of the one or more parameters is based in part on an available bandwidth of a receiver associated with the at least one receiver address.

15. The method of claim 1, wherein at least one of the one or more parameters is based in part on an availability of a receiver associated with the receiver address.

16. An apparatus comprising:
a routing unit configured to receive a multicast data packet, wherein the multicast data packet includes a multicast address associated with a multicast group; and
a control unit configured to:
identify a receiver address associated with the multicast address;
identify one or more parameters associated with the receiver address, wherein at least one of the one or more parameters identifies a type of content that is not to be sent to the receiver address; and
filter the multicast data packet based on the one or more parameters to generate a filtered data packet, wherein the filtering removes the type of content from the multicast data packet to generate the filtered data packet; and
the routing unit configured to transmit the filtered data packet to the receiver address.

17. The apparatus of claim 16, wherein at least one of the one or more parameters identifies a data size limit that can be sent to the receiver address.

18. The apparatus of claim 16, wherein at least one of the one or more parameters identifies a time at which data packets are not to be sent to the receiver address.

19. The apparatus of claim 16, wherein at least one of the one or more parameters comprises an instruction to not send an advertisement to the receiver address.

20. The apparatus of claim 16, wherein at least one of the one or more parameters is based in part on whether a receiver associated with the receiver address is roaming.

21. The apparatus of claim 16, wherein the control unit is further configured to filter a plurality of receiver addresses associated with the multicast address to identify one or more receiver addresses that are not to receive the multicast data packet.

22. The apparatus of claim 21, wherein the filtering of the plurality of receiver addresses is based at least in part on parameters associated with the plurality of receiver addresses, and wherein the parameters are associated with at least the one or more receiver addresses that are not to receive the multicast data packet.

23. An apparatus comprising:
means for identifying a multicast data packet having a multicast address associated with a multicast group;
means for identifying a receiver address associated with the multicast address;
means for identifying one or more parameters associated with the receiver address, wherein at least one of the one or more parameters identifies a type of content that is not to be sent to the receiver address;
means for filtering the multicast data packet based on the one or more parameters to generate a filtered data packet, wherein the means for filtering removes the type of content from the multicast data packet to generate the filtered data packet; and
means for transmitting the filtered data packet to the receiver address.

24. The apparatus of claim 23, wherein at least one of the one or more parameters is based in part on an available bandwidth of a receiver associated with the receiver address.

25. The apparatus of claim 23, wherein at least one of the one or more parameters is based in part on a characteristic of a display of a receiver associated with the receiver address.

26. The apparatus of claim 25, wherein the characteristic of the display comprises at least one of a size of the display, a color attribute of the display, or a graphical attribute of the display.

27. The apparatus of claim 23, wherein at least one of the one or more parameters comprises an instruction to not send an image to the receiver address.

28. The apparatus of claim 23, wherein at least one of the one or more parameters identifies a time at which data packets are not to be sent to the receiver address.

29. A non-transitory computer-readable medium having instructions stored thereon, the instructions comprising:
instructions for receiving a multicast data packet, wherein the multicast data packet includes a multicast address associated with a multicast group;
instructions to identify a_for identifying receiver address associated with the multicast address;
instructions to identify one or more parameters associated with at the receiver address, wherein at least one of the one or more parameters identifies a type of content that is not to be sent to the receiver address;
instructions to filter the multicast data packet based on the one or more parameters to generate a filtered data packet, wherein the filtering removes the type of content from the multicast data packet to generate the filtered data packet; and
instructions to transmit for the filtered data packet to the receiver address.

30. The computer-readable medium of claim 29, further comprising instructions to filter a plurality of receiver addresses associated with the multicast address to identify one or more receiver addresses that are not to receive the multicast data packet, wherein the filtering of the receiver addresses is based at least in part on parameters associated with the plurality of receiver addresses, and wherein the parameters are associated with at least the one or more receiver addresses that are not to receive the multicast data packet.

31. The computer-readable medium of claim 29, wherein at least one of the one or more parameters is based in part on an available bandwidth of a receiver associated with the receiver address.

32. The computer-readable medium of claim 29, wherein at least one of the one or more parameters comprises an instruction to not send an advertisement to the receiver address.

33. The computer-readable medium of claim 29, wherein at least one of the one or more parameters identifies a time at which data packets are not to be sent to the receiver address.

* * * * *

UNITED STATES PATENT AND TRADEMARK OFFICE
CERTIFICATE OF CORRECTION

| | | |
|---|---|---|
| PATENT NO. | : 8,037,134 B1 | Page 1 of 1 |
| APPLICATION NO. | : 10/049590 | |
| DATED | : October 11, 2011 | |
| INVENTOR(S) | : Uskela et al. | |

It is certified that error appears in the above-identified patent and that said Letters Patent is hereby corrected as shown below:

Title Page, item (57), under "Abstract", in Column 2, Line 18, delete "dam" and insert -- data --.

Column 7, line 16, in Claim 14, delete "with the at least one receiver address." and insert -- with the receiver address. --.

Column 8, line 31, in Claim 29, delete "identify a_for identifying receiver address" and insert -- identify a receiver address --.

Column 8, line 34, in Claim 29, delete "with at the receiver" and insert -- with the receiver --.

Column 8, line 42, in Claim 29, delete "transmit for the" and insert -- transmit the --.

Signed and Sealed this
Twenty-sixth Day of June, 2012

David J. Kappos
*Director of the United States Patent and Trademark Office*